(12) United States Patent
Ryhman

(10) Patent No.: US 6,789,579 B1
(45) Date of Patent: Sep. 14, 2004

(54) HOSE

(75) Inventor: Morgan Ryhman, Anderstorp (SE)

(73) Assignee: ABA of Sweden AB, Anderstorp (SE)

( * ) Notice: Subject to any disclaimer, the term of this patent is extended or adjusted under 35 U.S.C. 154(b) by 223 days.

(21) Appl. No.: 10/019,228

(22) PCT Filed: Jun. 6, 2000

(86) PCT No.: PCT/SE00/01163

§ 371 (c)(1), (2), (4) Date: Jan. 23, 2002

(87) PCT Pub. No.: WO01/01029

PCT Pub. Date: Jan. 4, 2001

(30) Foreign Application Priority Data

| Jun. 29, 1999 | (SE) | ................................................ 9902452 |
| Oct. 8, 1999 | (SE) | ................................................ 9903626 |

(51) Int. Cl.$^7$ ............................................. F16L 11/00
(52) U.S. Cl. ..................... 138/121; 138/122; 138/118; 138/177; 156/244.13
(58) Field of Search ............................... 138/121, 122, 138/138, 118, 177, 178, 117, 137, 140, 145; 156/244.13

(56) References Cited

U.S. PATENT DOCUMENTS

| 3,050,087 A | 8/1962 | Caplan ....................... 138/121 |
| 3,318,335 A | 5/1967 | Heller ......................... 138/121 |
| 5,397,157 A | 3/1995 | Hempel et al. .............. 285/227 |

FOREIGN PATENT DOCUMENTS

| EP | 0 791 775 | 8/1997 |
| SE | 368449 B | 7/1974 |
| SE | 403564 B | 8/1978 |

*Primary Examiner*—Patrick Brinson
(74) *Attorney, Agent, or Firm*—Birch, Stewart, Kolasch & Birch, LLP

(57) ABSTRACT

The present invention relates to a medium-carrying hose, preferably for pressure medium and for use in, for instance, an engine unit, the wall of the hose comprising at least one wall portion (5). The wall portion (5) is connected with at least one expansion portion (4) to form a continuous hose casing, so that the circumference of the hose is variable between a minimum value, when the expansion portion (4) is unexpanded, and a maximum value, when the expansion portion (4) is maximally expanded. The expansion portion (4) extends in the transverse and the longitudinal direction of the hose, the wall portions (5) being displaced relative to each other both in the transverse and in the longitudinal direction of the hose as the circumference increases and the expansion portion (4) expands. The invention also relates to a method for manufacturing such a hose.

23 Claims, 3 Drawing Sheets

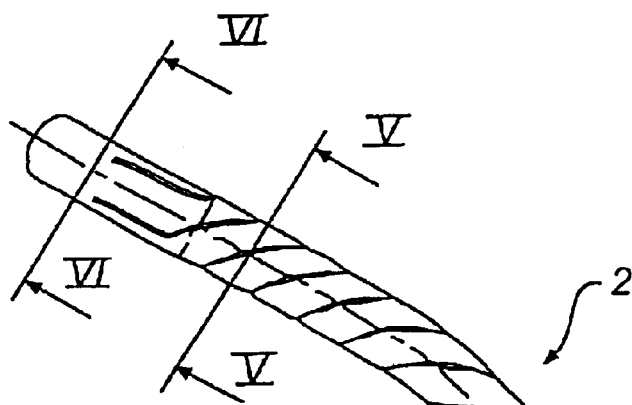
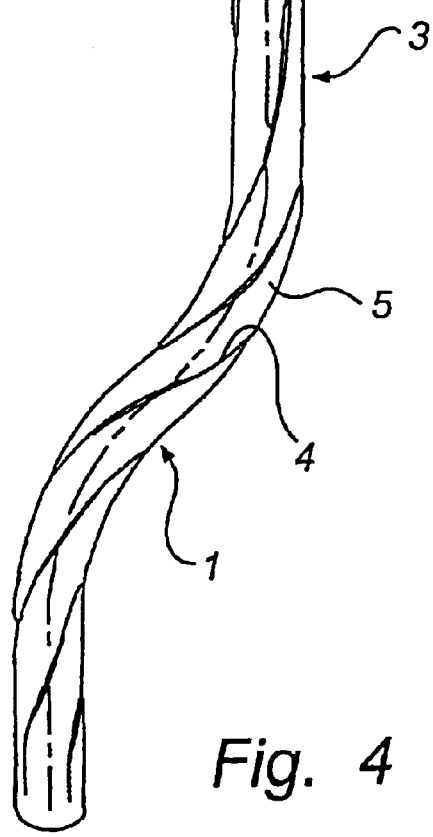
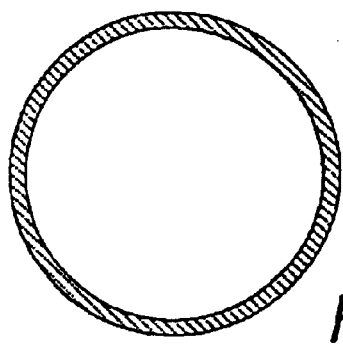
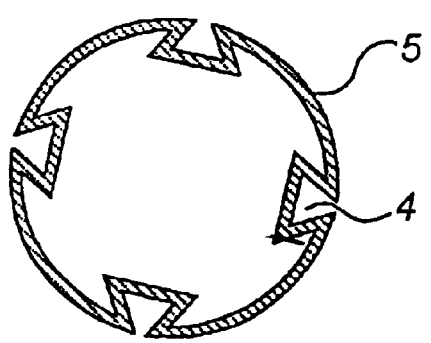
Fig. 6
Fig. 5
Fig. 4

HOSE

This application is the national phase under 35 U.S.C. §371 of PCT International Application No. PCT/SE00/01163 which has an International filing date of Jun. 6, 2000, which designated the United States of America and was published in English.

FIELD OF THE INVENTION

The present invention relates to a medium-carrying hose, preferably for pressure medium and for use in e.g. engine compartments, the wall of the hose comprising at least one wall portion which is connected with at least one expansion portion to form a continuous hose casing. The circumference of the hose is variable between a minimum value, when the expansion portion is unexpanded, and a maximum value, when the expansion portion is maximally expanded.

The invention also relates to a method for manufacturing such a hose.

BACKGROUND ART

Hoses of the type that is used in engine compartments are subjected to various effects of the surroundings. For instance, they can be subjected to pressure, from inside or from outside, or to relatively powerful vibrations as the engine is running. The space for hoses in motor compartments and the like is usually very limited. For an engine unit to be compact in terms of space, it is often necessary that the hoses be preformed and bent in given directions to fit between the other components of the engine. However there is one problem since the hose, when pressurised, tends to move or bulge in the engine compartment. The hose may then abut against other parts of the engine body, which for instance because of their temperature may damage the hose. This situation may also arise if the hose vibrates in the operation of the engine. Both pressurising and vibration besides cause a strain to the attachment of the hose in the engine unit.

There are today a plurality of hoses which have some kind of bellows structure at their ends, thereby reducing the vibrations in the attachment of the hose. However, such bellow structures do not affect the motion of the various parts of the hose, which are still essentially free and can abut against neighbouring objects.

Such a hose is disclosed in e.g. EP 0 791 775, where flexible portions at the ends of the hose are combined with a rigid hose portion in the middle of the hose. Vibrations are absorbed in the longitudinal direction of the hose at the hose ends, but otherwise the hose is allowed to move freely.

SUMMARY OF THE INVENTION

According to the invention the above problems are solved by a hose of the type mentioned by way of introduction, the expansion portion of the tube extending in the transverse and the longitudinal direction of the hose, the wall portions being displaced relative to each other in the transverse as well as the longitudinal direction of the hose as the circumference increases and the expansion portion expands.

By the expansion portion extending in the transverse and the longitudinal direction of the hose, the wall portions will be displaced in the transverse as well as the longitudinal direction when, for instance, pressurizing the hose. The direction of motion of the portions during pressurising can thus be controlled, so that there is no risk of the hose touching other components in, for example, an engine unit.

The wall portion has a substantially constant diameter and the expansion portions have a substantially smaller diameter than the wall. The expansion portion can extend first in one then in other direction, or diagonally across the transverse and the longitudinal direction of the hose. Also vibrations will be efficiently damped in a desirable manner when the vibrating motion of the wall portion is absorbed by the expansion portion. This means that the wall portion, and thus the hose, can be controlled in a desirable manner also in case of vibrations.

The wall and expansion portions may, if desirable, be differently formed in different parts along the hose in order to control, during expansion or vibration of the hose, the direction of motion of the different parts in a desirable manner. The relationships of the wall and expansion portions can also differ in different parts along the hose.

In such a hose, which is preformed to have a certain extent in the longitudinal direction, as is often the case of hoses intended for engine compartments, the design of, and the relationships of, the wall and expansion portions in the hose casing in each part of the hose is preferably adapted to the preform of the hose in the respective parts. One and the same preformed hose can thus advantageously be provided with differently formed expansion and wall portions.

Preferably the expansion portion may consist of a groove in the hose casing when this is in an unexpanded state. Such a groove is relatively easy to form by means of a design in which the expansion portion is formed in unity with the wall portion. The expansion of the groove can besides be controlled with the aid of the shape of its cross-section.

Preferably the groove is helically turned seen in the longitudinal direction of the hose. The helical shape means directly that the expansion portion is oriented both in the transverse and in the longitudinal direction of the hose. Pressure and shocks in both directions are therefore efficiently absorbed by the hose.

The number of turns of the helical groove per unit of length of the hose may be varied to control the hose as desired. The groove may also have different direction of turning in different parts of the hose, or different cross-sectional shape in different parts of the hose. This results in many possibilities of variation.

Preferably the hose has one or more expansion portions, which are distributed along the circumference of the hose casing, for satisfactory distribution of the pressure and/or shock equalisation in each individual case.

The invention also relates to a method for manufacturing a hose, according to the invention, in which the hose material is extruded. In addition to the hose material and together with this, a form material is extruded which is adapted to be a preform for the hose material for the desired configuration of expansion portions and wall portions. This preform serves to facilitate the process of extrusion. When the hose material, before blowing, has a relatively small diameter, there is a great risk that parts of the hose adhere to each other. This concerns in particular the expansion portions whose dimensions in the non-blown state are relatively small. A supporting form with expansion and wall portions is formed of the form material during extrusion and prevents problems in the forming of the hose material.

The form material is suitably arranged along the outer circumference of the hose material, which gives practical advantages in the method.

Preferably the form material is accumulated in the portions of the hose material which are intended to form expansion portions. These portions usually constitute formed portions such as grooves. The bulging shape which is necessary for the hose is produced by means of an elevated portion in the form material, thus a thicker portion of form material.

The form material can advantageously consist of an elastic material which extends along the circumference of the hose material. The form material of the completed hose will then be arranged along the circumference of the hose material and provides a smooth outer face for the hose. The elasticity of the material serves to make it possible for the expansion portions still to assume an unexpanded and an expanded state. A smooth outer face round the hose is advantageous since it is easier to keep clean than a hose with exposed expansion portions. The hose is then along its circumference provided with an elastic material.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

FIG. 4 shows a second embodiment of a hose according to the invention.

FIG. 5 is a cross-sectional view along line V—V of the hose in FIG. 4.

FIG. 6 is a cross-sectional view along line VI—VI of the hose in FIG. 4.

DESCRIPTION OF PREFERRED EMBODIMENTS

Figures 1, 2, 3:
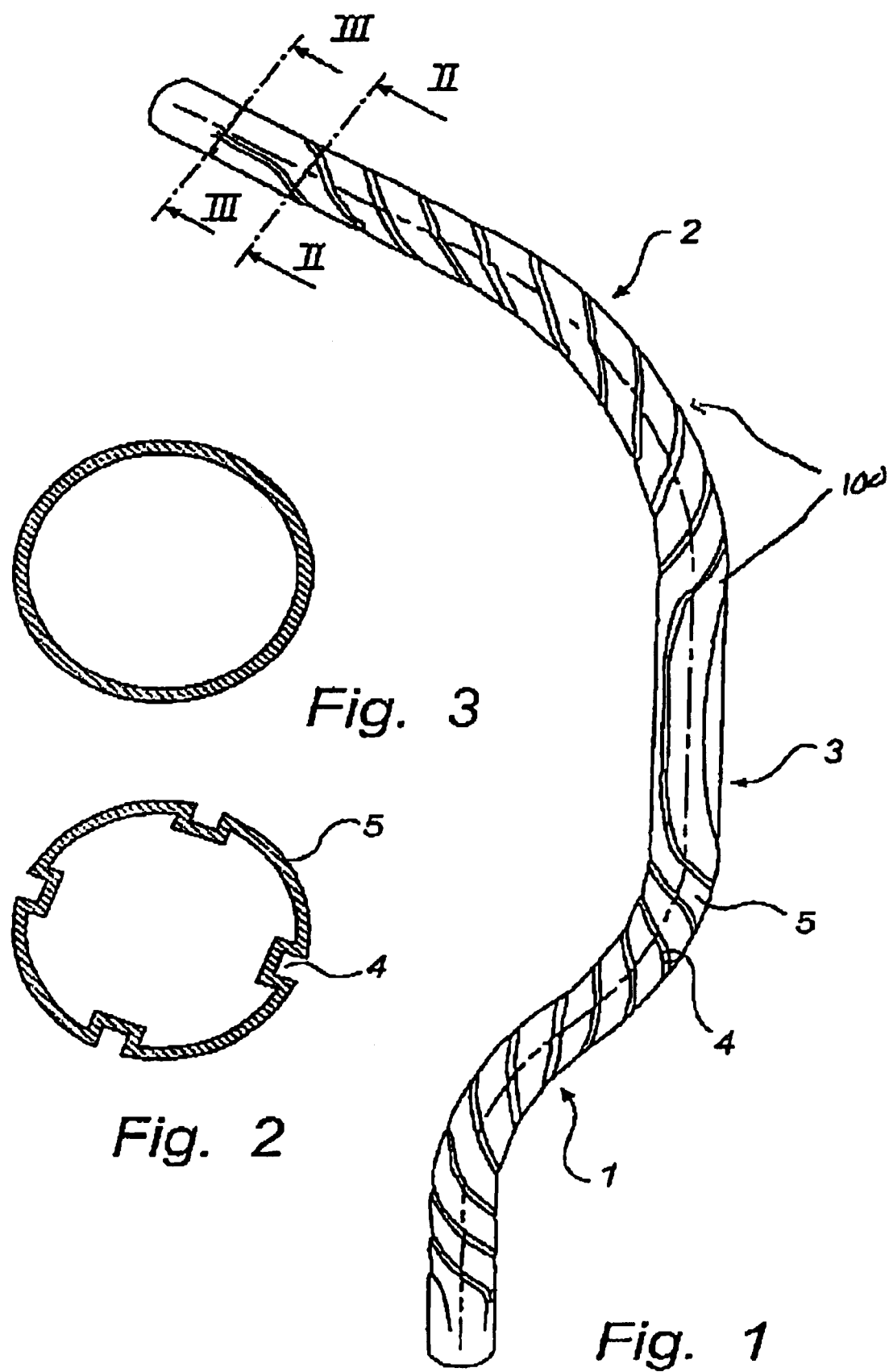
FIG. 1 shows an embodiment of a hose according to the invention.
FIG. 2 is a cross-sectional view along line II—II of the hose in FIG. 1.
FIG. 3 is a cross-sectional view along line III—III of the hose in FIG. 1.

FIG. 1 illustrates a preferred embodiment of a hose according to the invention. The hose is preformed with a plurality of bends 1, 2 and a straight central portion 3. The circumferential surface of the hose is formed with grooves 4 which extend along the hose. In the first bent part 1 of the hose, the grooves 4 are helically turned along the hose. In this portion 1, shocks as well as pressure can be absorbed in several directions. In the second straight portion 3 of the hose, the number of turns of the helix per unit of length is considerably smaller, i.e. so small that the groove 4 extends essentially along the hose. In the middle of the straight portion 3, the helical groove 4 changes direction round the hose in order to form in this new direction a helix having a larger number of turns per unit of length in the last, bent part 2 of the hose.

The cross-section of the hose is shown in FIG. 2. Here the cross-sectional shape of the grooves 4 is essentially rectangular. Four grooves 4 are uniformly distributed along the circumference of the hose with wall portions 5 therebetween. In one of the end portions of the hose, the hose is smooth and without grooves 4, as shown in FIG. 3.

FIG. 4 shows another embodiment of a hose according to the invention. The helical shape of the grooves 4 is similar to that of the hose in FIG. 1. The cross-sectional shape of the grooves 4, however, is different, which is evident from FIG. 5. Here the grooves 4 form a more acute angle to the wall portions 5 and between the walls of the groove. This design can, if it is made of the same material as in the embodiment in FIG. 1, absorb greater pressure and more powerful vibrations than in the embodiment in FIG. 1 owing to the greater expansibility of the grooves.

Figure 7:
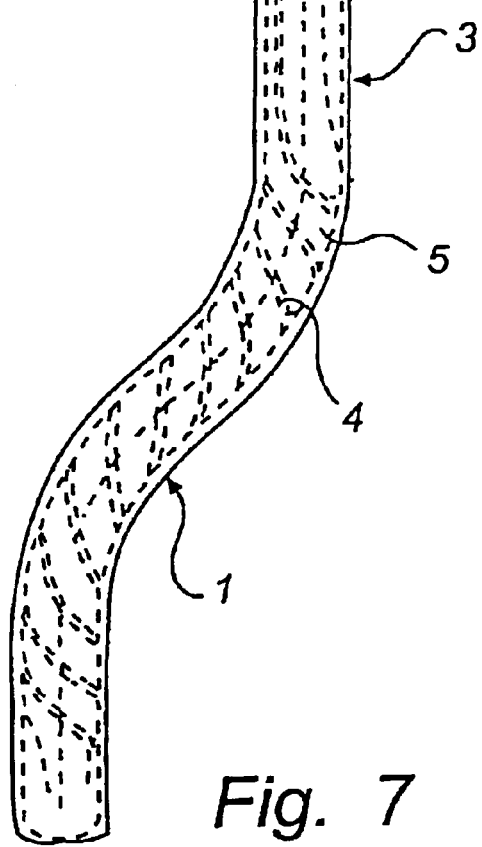
FIG. 7 shows a third embodiment of a hose according to the invention.
Figure 8:
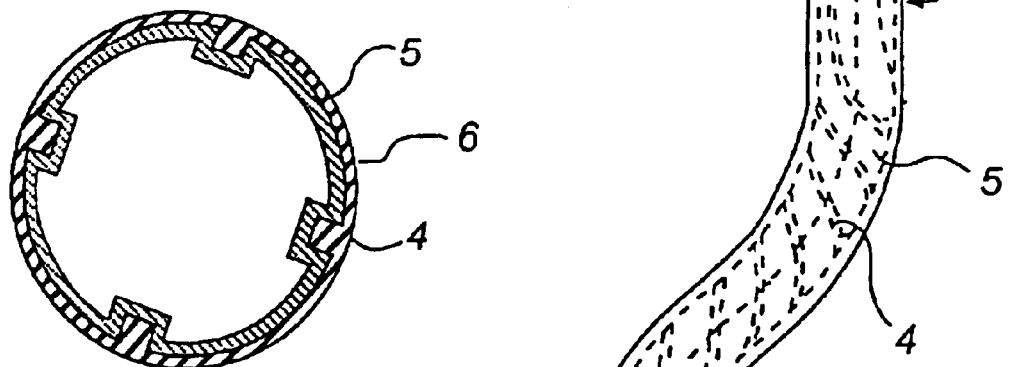
FIG. 8 is a cross-sectional view along line VII—VII of the hose in FIG. 7.

FIGS. 7–8 show a hose according to the invention, which is provided with an elastic form material along its circumference. In the manufacture of the hose by extrusion, the form material serves to give the hose the desired form with expansion and wall portions. In this embodiment an elastic form material is used, which is fixedly arranged on the hose and provides a smooth surface. The smooth surface can be advantageous to protect the hose from dirt. The elastic material, however, does not significantly prevent the relative movability between the portions. It is also possible to use a form material which is washed away after the hose is completed. Such a form material would then be used only in the extrusion and then be removed from the hose. The final result will then be a hose according to, for example, FIGS. 1–3.

Figure 9:
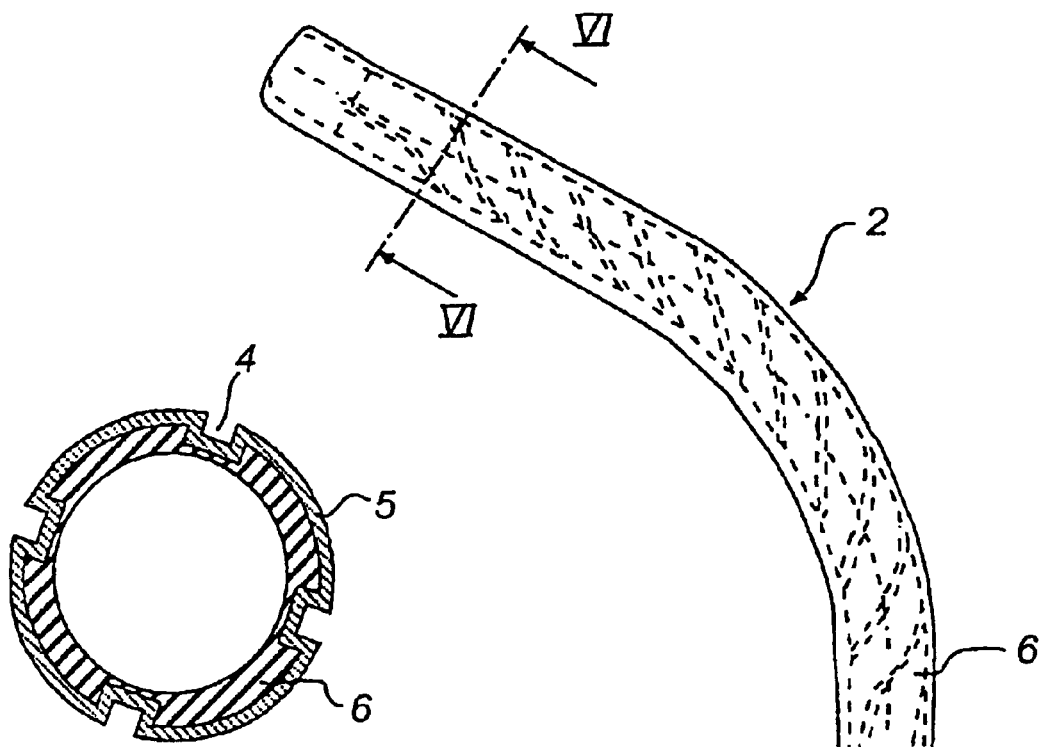
FIG. 9 is a cross-sectional view of one more embodiment of a hose according to the invention.

It is also possible to arrange an elastic material along the inner circumference of the hose. This yields the same advantages in terms of manufacture as those mentioned above, and also gives the hose a smooth inside, which may be advantageous for the flow through the hose. The cross-section of such an embodiment of a hose according to the invention is shown in FIG. 9.

It goes without saying that many embodiments in addition to those described above are feasible. The shapes of the hoses and the grooves 4 can be varied in many ways. For example, the cross-sectional shape of the groove can be different in different parts of the hose 100. Instead of having grooves, the expansion portions can be designed in some other fashion, provided that efficient expansibility is obtained, For instance, the expansion portions 4 can be made of an elastic material which is put together with the wall portions 5, or of a weakened area which owing to its thinner wall thickness will be more elastic than the surrounding wall portions 5. By varying the above different parameters, the hose portions can thus be made to be displaced in the desired direction in pressurising or in case of vibrations. Of course, the preform of the hose can also be of a different design, according to the invention, thanks to the expansion portions, can be made flexible. Also the direction of the flexibility is then dependent on the relationship of the expansion portions 4 and the wall portions 5.

Hoses according to the invention may also be provided with certain parts without any vibration-absorbing arrangements whatever.

Although the embodiments described above constitute hoses with a groove having a varying direction of turning in different parts of the hose, it is possible to have the same direction of turning along the entire hose. The cross-sectional shape may also be varied or constant along the hose, according to the requirements in the individual case. The hose can have one or more expansion portions, which can be uniformly or irregularly arranged.

It is also possible to have hoses where an elastic material is arranged both on the outer and on the inner circumference of the hose. The arrangement of elastic material can be optimised for manufacture of the hose, for the flow therethrough as well as for cleaning. The effect of the grooves on the flow through the hose can optionally be used to control the flow.

The invention being described, it will be obvious that the same may be varied in many ways. Such variations are not to be regarded as a departure from the spirit and scope of the invention, and all such modifications as would be obvious to one skilled in the art are intended within the scope of the following claims.

What is claimed is:

1. A medium-carrying hose, a wall of the hose comprising at least one wall portion which is connected with at least one expansion portion to form a continuous hose casing, so that the circumference of the hose is variable between a minimum value, when the expansion portion is unexpanded, and a maximum value, when the expansion portion is maximally expanded and said expanded portion extends in the transverse and the longitudinal direction of the hose, the wall portions being displaced relative to each other in transverse as well as the longitudinal direction of the hose as the circumference increases and the expansion portion expands, the wall portion has a substantially constant diameter and the expansion portions have a substantially smaller diameter than the wall and the wall and expansion portions are differently formed in different parts along the hose in order to control, during expansion or vibration of the hose, the direction of motion of different parts.

2. The medium-carrying hose according to claim 1, wherein relationships of the wall and expansion portions are different in different parts along the hose in order to control, during expansion of the hose, the direction of the motion of the different parts.

3. The medium-carrying hose according to claim 1 or 2, the hose is preformed to have a certain extent in the longitudinal direction, and that the design of, and the relationships of, the wall and expansion portions in the hose casing in each part of the hose is adapted to the preform of the hose in the respective parts of the hose.

4. The medium-carrying hose according to claim 1, wherein the expansion portion is a groove in the hose casing when this is in an unexpanded state.

5. The medium-carrying hose according to claim 4, wherein the groove is helically turned in the longitudinal direction of the hose.

6. The medium-carrying hose according to claim 5, wherein the helical groove has a varying number of turns per unit of length of the hose.

7. The medium-carrying hose according to claim 5 or 6, wherein the helical groove has different direction of turning in different parts of the hose.

8. The medium-carrying hose according to claim 5, wherein the cross-sectional shape of the groove is different in different parts of the hose.

9. The medium-carrying hose according to claim 1, wherein the hose has at least two expansion portions, which are uniformly distributed along the circumference of the hose casing.

10. The medium-carrying hose according to claim 1, wherein the hose has four wall portions in addition to four expansion portions, which are alternatingly arranged along the circumference of the hose casing.

11. A medium-carrying hose, a wall of the hose comprising at least one wall portion which is connected with at least one expansion portion to form a continuous hose casing, so that the circumference of the hose is variable between a minimum value, when the expansion portion is unexpanded, and a maximum value, when the expansion portion is maximally expanded and said expanded portion extends in the transverse and the longitudinal direction of the hose, the wall portions being displaced relative to each other in the transverse as well as the longitudinal direction of the hose as the circumference increases and the expansion portion expands, the wall and expansion portions are differently formed in different parts along the hose in order to control, during expansion or vibration of the hose, the direction of motion of the different parts, the hose along its circumference is provided with an elastic material.

12. A medium-carrying hose, a wall of the hose comprising at least one wall portion which is connected with at least one expansion portion to form a continuous hose casing so that the circumference of the hose is variable between a minimum value, when the expansion portion is unexpanded, and a maximum value, when the expansion portion is maximally expanded and said expanded portion extends in the transverse and the longitudinal direction of the hose, the wall portions being displaced relative to each other in the transverse as well as the longitudinal direction of the hose as the circumference increases and the expansion portion expands, the wall and expansion portions are differently formed in different parts along the hose in order to control, during the expansion or vibration of the hose, the direction of motion of the different parts, the hose along its inner circumference is provided with an elastic material.

13. A method for manufacturing a medium-carrying hose, a wall of the hose comprising at least one wall portion which is connected with at least one expansion portion to form a continuous hose casing, so that the circumference of the hose is variable between a minimum value, when the expansion portion is unexpanded, and a maximum value, when the expansion portion is maximally expanded and said expanded portion extends in the transverse and the longitudinal direction of the hose, the wall portions being displaced relative to each other in the transverse as well as the longitudinal direction of the hose as the circumference increases and the expansion portion expands, the wall and expansion portions are differently formed in different parts along the hose in order to control, during expansion or vibration of the hose, the direction of the motion of the different parts by extruding the materials forming the hose, in addition to the hose material and together therewith, a form material, which is adapted to be a preform for the desired configuration of the expansion portions and wall portions of the hose material, the form material or being arranged along one of an outer circumference of the hose material or being arranged extending along an inner circumference of the hose material.

14. The method according to claim 13, wherein the form material is arranged along the outer circumference of the hose material.

15. The method according to claim 13 or 14, wherein the form material is accumulated in the portions of the hose material which are adapted to form expansion portions.

16. The method according to claim 13, wherein the form material is an elastic material, which extends along the circumference of the hose material.

17. The method according to claim 16, wherein the form material in the completed hose is arranged along the circumference of the hose material and provides a smooth outer face for the hose.

18. The method according to claim 13, wherein the form material is removed from the hose material in order to form the completed hose.

19. The method according to claim 18, wherein the form material is washable away from the hose material.

20. The medium-carrying hose according to claim 1, wherein the hose is for pressure medium and can be used in engine compartments.

21. The medium-carrying hose according to claim 11, wherein the hose is for pressure medium and can be used in engine compartments.

22. The medium-carrying hose according to claim 12, wherein the hose is for a pressure medium and can be used in engine compartments.

23. The method according to claim 13, wherein the hose is usable for a pressure medium and in engine compartments.

* * * * *